ature Patent [19]

Hass et al.

[11] 4,060,589
[45] Nov. 29, 1977

[54] PROCESS FOR REDUCING NO$_x$ AND/OR SO$_x$ IN FEED GAS STREAMS

[75] Inventors: Robert H. Hass, Fullerton; Michael H. Gibson, Santa Ana, both of Calif.

[73] Assignee: Union Oil Company of California, Los Angeles, Calif.

[21] Appl. No.: 652,290

[22] Filed: Jan. 26, 1976

[51] Int. Cl.$^2$ .............................................. C01B 17/16
[52] U.S. Cl. .................... 423/244; 423/239; 423/563; 423/564; 423/569
[58] Field of Search .............. 423/235, 239, 244, 563, 423/564, 569

[56] References Cited

U.S. PATENT DOCUMENTS

| 224,426 | 2/1880 | Hartmann | 423/263 |
| 1,407,323 | 2/1922 | Browning | 423/263 |
| 3,795,730 | 3/1974 | Kalvinsras | 423/239 |
| 3,810,972 | 5/1974 | Humphrey et al. | 423/569 |

FOREIGN PATENT DOCUMENTS

| 139,421 | 11/1950 | Australia | 423/260 |
| 1,222,901 | 8/1966 | Germany | 423/239 |
| 350,124 | 6/1931 | United Kingdom. | |
| 437,236 | 10/1935 | United Kingdom. | |
| 471,668 | 9/1937 | United Kingdom. | |
| 223,794 | 11/1968 | U.S.S.R. | 423/239 |

*Primary Examiner*—G. O. Peters
*Attorney, Agent, or Firm*—Gregory F. Wirzbicki; Lannas S. Henderson; Richard C. Hartman

[57] ABSTRACT

A process is disclosed whereby NO$_x$ and SO$_x$ components contained in stack gases are simultaneously reduced to N$_2$ and H$_2$S, respectively, by passing said stack gases (which also contain steam and usually some oxygen) over bituminous coke at between about 900° and 1600° F.

9 Claims, 1 Drawing Figure

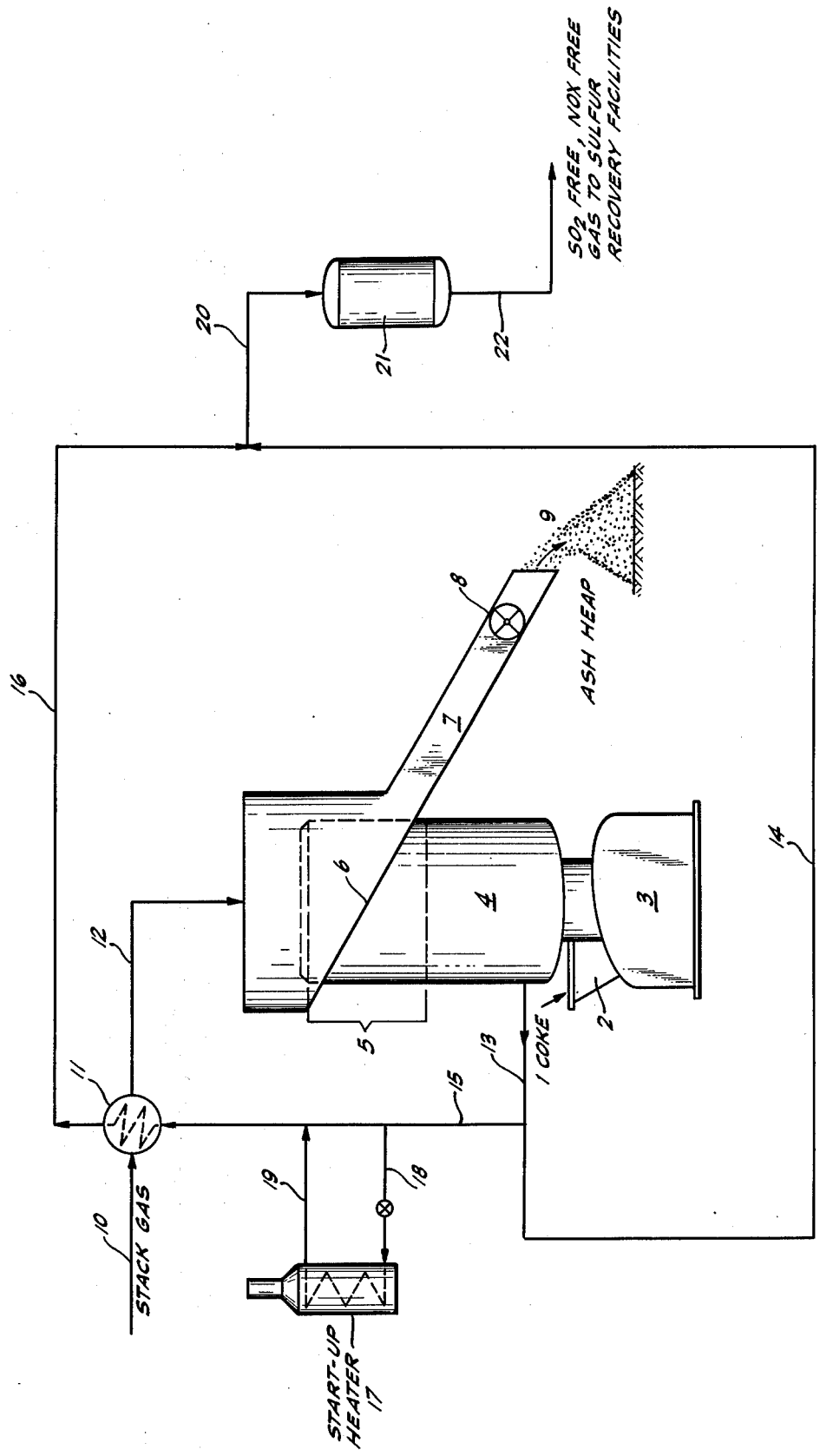

PROCESS FOR REDUCING $NO_x$ AND/OR $SO_x$ IN FEED GAS STREAMS

BACKGROUND OF THE INVENTION

This invention is concerned with the removal of $NO_x$ and $SO_x$ components from gas streams, especially stack gas streams.

PRIOR ART

It has long been an ecological necessity to remove $NO_x$ and $SO_x$ components from industrial stack gases. In many processes only $SO_2$ and $SO_3$ are removed, usually by scrubbing with an alkaline solution. One method known for removing both $NO_x$ and $SO_2$ from a stack gas is first to combust sufficient methane added to the stack gas stream to deplete the oxygen contained therein by conversion to $CO_2$ and CO. When this treated gas stream is passed over a reducing catalyst, the $NO_x$ components combine with CO to form $N_2$ and $CO_2$, both of which are innocuous and can be discharged to the atmosphere. $SO_2$ is also removed in this process by conversion to sulfur vapor and COS.

Another method for treating stack gases is by first passing the gas through a char adsorption media to adsorb $O_2$, $SO_2$, $H_2O$, and some $NO_2$, thus separating most of the air pollutants from the remainder of the stack gases which are sent to the atmosphere. Subsequently, the saturated adsorbent is passed to a regeneration vessel wherein heat is used to dissociate the adsorbed $NO_x$ compounds and to drive off the adsorbed gases, thereby producing a gas stream consisting essentially of $O_2$, $SO_2$, $H_2O$ and $N_2$. This gas stream is then contacted with a moving bed of anthracite wherein the $SO_2$ reacts with the coal to produce elemental sulfur (which is separated and removed) and COS. Since the COS concentration of the product gas stream is too high for atmospheric discharge, it must be incinerated. (For a fuller explanation of this process, see *Environmental Science & Technology*, Vol. 9, No. 8, August 1975, pages 712–713, and *Chemical Engineering*, Jan. 6, 1975, pages 74–75.)

The problems inherent in the art are typified in the aforementioned processes. In the first process, valuable methane must be continually burned to effect the $NO_x$ conversion, while in the latter only a portion of the $NO_x$ components, usually less than half, is reduced to nitrogen. Also, neither process achieves the reduction of both $NO_x$ and $SO_2$ in one step, thus necessitating the expenditure of large sums of money for additional utilities and equipment required for multi-step processes. Lastly, in both processes the formation of COS in large proportions presents atmospheric pollution problems.

It is therefore one objective of the present invention to use carbonaceous materials like coke to effect the simultaneous reduction of $SO_x$ and $NO_x$ components. It is another objective to reduce the COS concentration of the effluent gas stream to levels significantly below those presently achieved in the art. It is another object to utilize the coke to remove particulate matter from the stack gases by filtration. It is yet another objective to produce sufficient $H_2$ during the reduction of the $SO_x$ and $NO_x$ components such that, when the purified gas stream is passed over a conventional hydrogenation catalyst, residual $SO_2$ present therein will be reduced. Other objectives and advantages will be apparent from the disclosure to follow.

SUMMARY OF THE INVENTION

It has now been discovered that $NO_x$ and/or $SO_x$ components in stack gases may be reduced by passing said stack gases at 900°–1600° F over coal, coke, or char obtained from coal gasification plants. Water vapor in the stack gases reacts with the coke to produce CO and $H_2$, the former reacting with the $NO_x$ components to form $N_2$ and the latter reacting with the $SO_x$ components to produce $H_2S$. Temperatures in excess of 900° F are required, the preferred temperatures being between about 1250° and 1500° F.

As used herein, the term $NO_x$ shall embrace all gaseous nitrogen oxides, including NO, $NO_2$, $N_2O_3$, $N_2O_4$, etc. The term $SO_x$ shall embrace $SO_2$ and $SO_3$.

DETAILED DESCRIPTION OF THE INVENTION

A preferred embodiment of the invention is best described by reference to the simplified flow diagram shown in the drawing. A bituminous coke of any kind, including high sulfur (i.e., >1.0 wt. % S) bituminous coke, is fed at 1 into hopper 2 wherefrom it is fed upwardly into reactor 4. This is accomplished by means of a vertically acting piston feeder 3 of the type shown in U.S. Pat. No. 2,501,153, herein incorporated by reference, which, by means of reciprocating piston, continuously forces the coke upwardly through reactor 4 at a rate of between about 100 and 1000 lbs/hr-ft$^2$ of average cross-sectional internal area of reactor 4. The coke proceeds upwardly through combustion zone 5 wherein it is combusted to ash in a manner to be described hereinafter. The ash then overflows the brim of the reactor and falls onto inclined peripheral floor 6 which is affixed in fluid-tight fashion to the outer wall of the reactor 4. It then gravitates down chute 7 and, by means of a star feeder 8 or other suitable device to prevent the escape of gas, is discharged to waste at 9.

Meanwhile, a stack gas, or other feed gas stream containing water vapor and at least one component selected from the class consisting of $NO_x$ and $SO_x$ components, is fed into line 10. This stack gas should contain at least 0.1 mol % of $NO_x$ and/or $SO_x$ component(s); water vapor should also be present therein in excess of about three times the molar percentage content of the $NO_x$ plus $SO_x$ component(s). Preferably, the water vapor content should be at least ten times, still more preferably, at least 25 times, that of the molar percentage content of the $NO_x$ plus $SO_x$ component(s). A typical stack gas will contain the following components in the indicated range of molar percentages:

TABLE I

| Component | Mol % | Component | Mol % |
|---|---|---|---|
| $O_2$ | 0 – 5 | $H_2O$ | 5 – 25 |
| CO | 0 – 0.5 | $SO_2$ | 0 – 1.0 |
| $CO_2$ | 10 – 20 | $N_2$ | 70 – 75 |
| NO | 0 – 0.2 | $SO_3$ | 0 – 0.013 |

The stack gas introduced into line 10 should be fed at a rate of between $1.0 \times 10^6$ and $10 \times 10^8$ SCF/ton of coke feed, the feed rate depending to a large extent on the $O_2$ content of the feed gas. For reasons of economy, it is desirable to adjust feed gas/coke ratios so as to give substantially complete conversion of the coke to mineral ash, while at the same time adjusting feed gas inlet temperature to give the desired conversion of feed gas components.

Since stack gases are generally at a temperature between about 160° and 500° F, and since the minimum peak operating temperture in combustion zone 5 is 900° F, it is necessary under most circumstances to heat the stack gas in preheater 11 prior to introducing it into reactor 4 via line 12. The degree of preheating, however, will vary, depending upon the oxygen content of the stack gas. If the stack gas contains no oxygen (a rare occurrence because nearly all commercial combustion units, especially fossil fueled boilers, operate under net oxidizing conditions), then it must be preheated to the desired combustion zone peak operating temperature. If it contains oxygen, however, the degree of preheating will be less, and in some instances may not be necessary at all. Stack gases containing oxygen will, when contacted with coke in combustion zone 5 at temperatures in excess of 850° F, effect combustion of the coke according to:

$$2C + O_2 \rightarrow 2CO \quad (K_p \text{ at } 1300° F = 4.09 \times 10^{10}) \quad (I)$$

$$C + O_2 \rightarrow CO_2 \quad (K_p \text{ at } 1300° F = 1.41 \times 10^{21}) \quad (II)$$

Since both of these reactions are exothermic, a temperature rise in said combustion zone 5 can be expected. For the stack gas composition of Table I, this temperature rise will be about 180° F/mol % of $O_2$ in the stack gas. Thus, when $O_2$ is present in the stack gas, it will only be necessary to preheat to some temperature at or in excess of 850° F such that, when supplemented with the expected temperature increase due to the coke-oxygen reactions, the desired peak operating temperatures in combustion zone 5 will be attained.

The reactions between oxygen and coke as shown in Reactions (I) and (II) are effected in combustion zone 5 under net reducing conditions (i.e., there always being more coke traversing the combustion zone than there is oxygen to consume it). Once the oxygen in the stack gas traversing combustion zone 5 is depleted, either because there was none in the stack gas to begin with or because it was consumed by the coke-oxygen reactions, sufficient heat will be available from the preheating and/or the exothermic coke-oxygen reactions such that the peak temperature within said combustion zone will be at least 900° F. Preferably, the peak combustion zone operating temperature should be between about 1200° and 1600° F, and even more preferably, between about 1250° and 1500° F. Under such temperature conditions sufficient quantities of $H_2$ and/or CO for the purposes herein will be produced by:

$$C + H_2O \rightleftarrows CO + H_2 \quad (K_p \text{ at } 1300° F = 1.794) \quad (III)$$

and a reducing gas comprising CO from Reactions (I) and (III) and $H_2$ from Reaction (III) will hence be formed. The $H_2$ and CO reduction components are believed to react with $SO_x$ and $NO_x$ components in combustion zone 5 under the temperature conditions recited as follows:

$$SO_2 + 3H_2 \rightleftarrows H_2S + 2H_2O \quad (K_p \text{ at } 1300° F = 2.74 \times 10^7) \quad (IV)$$

$$2NO + 2CO \rightleftarrows N_2 + 2CO_2 \quad (K_p \text{ at } 1300° F = 5.16 \times 10^{14}) \quad (V)$$

$$2NO_x + (2x)CO \rightleftarrows N_2 + (2x)CO_2 \quad (VI)$$

$$N_2O_x + xCO \rightleftarrows N_2 + xCO_2 \quad (VII)$$

$$SO_2 + 3CO \rightleftarrows COS + 2CO_2 \quad (K_p \text{ at } 1300° F = 3.43 \times 10^6) \quad (VIII)$$

$$SO_3 + 4H_2 \rightleftarrows H_2S + 3H_2O \quad (K_p \text{ at } 1300° F = 2.66 \times 10^{17}) \quad (IX)$$

$$2SO_x + xC \rightarrow 2S + xCO_2 \quad (X)$$

Conversions of $SO_x$ to various gaseous sulfur components between about 30 and 75%, usually between about 50 and 75%, complete can be obtained at peak combustion zone operating temperatures less than about 1250° F; however, $SO_x$ conversions of at least about 80%, usually in excess of about 90%, complete are obtainable if a temperature within the preferred combustion zone peak operating temperature range of 1250°–1500° F is maintained. Conversions of $NO_x$ components to nitrogen are even more favorable. At peak combustion zone operating temperatures less than 1250° F, conversions to nitrogen between about 75 and 95% complete are obtainable; in the preferred peak operating temperature range of 1250°–1500° F, conversions in excess of 90%, usually in excess of 95%, are achieved regularly.

The treated stack gas, or other gaseous effluent, is removed from reactor 4 via line 13. It may either be immediately sent to conventional $H_2S$ removal facilities via line 14 or directed to preheater 11 via line 15 prior to being sent to such facilities via line 16. The treated stack gas may heat the incoming stack gas in preheater 11 either directly (by commingling therewith) or indirectly; the latter means is preferred inasmuch as direct preheating necessitates a larger sized reactor 4. The choice of which method to use, however, will depend upon the nature of the stack gas which must be treated and the economics involved.

A conventional fired heater 17 may be utilized, if necessary, for start up purposes by simply directing as much of the treated flue gas in line 15 as required to the heater via line 18 wherefrom by line 19 sufficient heated gas may then be directed to preheater 11.

The treated stack gases in line 14 and 16 will contain, in addition to $H_2S$, one or more of $SO_2$, COS, $CH_3SH$, $SO_3$ and $CS_2$, the latter two components usually only being present in trace proportions (<15 ppmv total) when a typical stack gas of composition shown in Table I is being treated. ($SO_3$ should be especially be present in low concentrations because, being more reactive than either $SO_2$ or $O_2$, it should react preferentially with the available $H_2$ and coke.) The treated stack gases may also contain trace proportions of sulfur vapor formed by Reaction (X) and the Claus reaction:

$$SO_2 + 2H_2S \rightleftarrows 3S + 2H_2O \quad (K_p \text{ at } 1300° F = 4.87) \quad (XI)$$

More importantly, however, it will also contain $H_2$ from Reaction (III) in quantities sufficient to reduce $SO_2$, $SO_3$, $CH_3SH$ and S vapor to $H_2S$ and usually sufficient water vapor to hydrolyze the COS and $CS_2$ components to $H_2S$. For example, when a stack gas of composition shown in Table I is processed by the method herein, the treated stack gases so obtained will contain in excess of 0.1 mol % $H_2$, usually between about 0.3 and 3.0 mol % $H_2$ when peak operating temperatures in excess of 1250° F are utilized; the water vapor concentration will usually be in excess of 5 mol %. Thus, if these treated stack gases are passed at a temperature between about 300° and 800° F via line 20 into reactor 21 containing a cobalt-molybdate catalyst, a purified gas stream containing $H_2S$ as essentially the only gaseous sulfur component therein will be obtained in line 22.

Post-treating the treated stack gases in this manner is conventional and is described in U.S. Pat. No. 3,752,877, which is herein incorporated by reference. The unusual feature of utilizing this conventional process, usually called the Beavon process, to post-treat the treated stack gases obtained from lines 14 and 16 resides firstly in the fact that, there not being any oxygen and usually no appreciable $SO_3$ in the treated stack gases, the passage of said treated stack gases over the cobalt-molybdate catalyst will not result in the poisoning thereof. Also, no hydrogen need be added to the treated stack gas to achieve complete conversion of the $SO_2$, $CH_3SH$, $SO_3$ and S vapor components to $H_2S$; this obviates the need for separate facilities to generate $H_2$. It is also noted that, if there is not sufficient water vapor in the treated stack gases to effect the hydrolysis of COS and $CS_2$ to $H_2S$, the necessary amount of water vapor may be supplied by the reduction of $SO_2$ and $SO_3$ via Reactions (IV) and (IX), respectively, in reactor 21. Additionally, if CO is present in the treated stack gases, it will react with available water vapor to produce $H_2$ and $CO_2$; this at once helps to eliminate CO from these gases as an atmospheric pollutant and supplements the supply of $H_2$ for use in reactor 21.

The gases in line 22 now containing essentially only $H_2S$ as a gaseous sulfur constituent may then be treated for removal of $H_2S$ therefrom by any of several conventional processes. One such is the Stretford process briefly described in the aforesaid U.S. Pat. 3,752,877 and more explicitly in U.S. Pat. Nos. 3,035,889 and 3,097,926.

The following example demonstrates the effectiveness of the use of a coke bed for converting $NO_x$ and $SO_x$ in a stack gas.

EXAMPLE

A synthetic stack gas consisting of the following nominal composition:

TABLE II

| Component | Mol % Wet Basis | Mol % Dry Basis |
|---|---|---|
| $O_2$ | 3.40 | 3.78 |
| CO | 0.05 | 0.06 |
| $CO_2$ | 13.50 | 15.00 |
| NO* | 0.05 | 0.06 |
| $SO_2$* | 0.20 | 0.22 |
| $H_2O$ | 10.00 | — |
| $N_2$ | 72.80 | 80.88 |

*Note: actual NO and $SO_2$ present in the synthetic stack gas of each run are shown in Table IV was treated for removal of $SO_2$ and NO components. (It is noted that the 0.20 mol % (2000 ppmv) concentration of $SO_2$ in this stack gas composition is typical of that found in power plant flue gases obtained from burning coal having a sulfur content in excess of 3.0 wt. %.) Three runs were made over each of two types of coke, one derived from Alabama coal and the other derived from Pennsylvania coal. Both cokes were high temperature metallurgical cokes of the kind used in steel production. The coke properties were as follows:

TABLE III

| Type of Coke | Alabama | Pennsylvania |
|---|---|---|
| Size (after pulverizing) | 10–20 mesh | 10–20 mesh |
| Compacted Bulk Density, g/cc | 0.649 | 0.871 |
| Carbon, wt.% | 85.5 | 79.1 |
| Sulfur, wt.%* | 0.58 | 1.15 |
| Iron, wt.% | 0.67 | 0.99 |
| Ash, wt.% | 9.3 | 13.7 |
| Metals, ppm | | |
| Cu | 27 | 31 |
| Al | 15,200 | 21,400 |
| Ni | 51 | 115 |
| V | 32 | 40 |

*Note: Under the conditions specified in this Example, the $SO_2$ released by the coke during combustion increased the $SO_2$ concentration of the synthetic stack gas by 87 ppmv in the case of the low sulfur coke and by 171 ppmv in the case of the high sulfur coke.

The three runs over fixed beds of each type of coke were conducted at 1200° F, 1300° F, and 1400° F, respectively, in a reactor held isothermally at the three temperatures indicated. 150 cc of coke were used in each of the 6 runs, and the space velocity was 1584 GHSV (the gas volume rate being measured at 60° F and 1 atm) in each instance.

Each run was continued for 6 hours and product gas samples were taken every 2 hours and analyzed on a dry basis (dew point = ~80° F) by conventional mass spectrometrical techniques. The average dry product composition and the conversion percentages of $SO_2$ and NO (as measured by the disappearance of each) are shown in Table IV. Since water had to be removed by condensation (at ~80° F) prior to analyzing the product gases by means of the mass spectrometer, some elemental sulfur not only was condensed therein but also was formed therein by the aqueous Claus reaction. This conclusion is supported by the fact that an overall sulfur mass balance showed the greatest amount of unaccounted for product gas sulfur, in whatever form, when the $H_2S:SO_2$ ratio approached 2.0, the ratio required to maximize the formation of elemental sulfur by the Claus reaction. Therefore, this unaccounted for sulfur was presumed to exist mostly as $H_2S$ and $SO_2$ in a 2:1 ratio in the "wet" product gases and, also, to a minor extent as $S_2$ vapor. Appropriate trial and error equilibria calculations determined the respective proportions of $H_2S$ and $SO_2$ which were lost during the water condensation and the proportion of $S_2$ vapor which was in equilibrium with product gases. These proportions, corrected to a dry basis, are represented in Table IV as $H_2S$ (calc), $SO_2$ (calc) and $S_2$ (calc), respectively.

TABLE IV

| | 1200° F | | | | 1300° F | | | | 1400° F | | | |
|---|---|---|---|---|---|---|---|---|---|---|---|---|
| Feed Component | Low S Mol % | Coke PPMV | High S Mol % | Coke PPMV | Low S Mol % | Coke PPMV | High S Mol % | Coke PPMV | Low S Mol % | Coke PPMV | High S Mol % | Coke PPMV |
| $SO_2$* | | 2217 | | 2441 | | 2175 | | 2311 | | 2247 | | 2391 |
| NO | | 577 | | 577 | | 550 | | 580 | | 540 | | 599 |
| Product Component | | | | | | | | | | | | |
| $CH_3SH$ | — | 8 | — | 9 | — | 10 | — | 9 | — | 14 | — | 9 |
| COS | — | 199 | — | 610 | — | 528 | — | 241 | — | 282 | — | 279 |
| $SO_2$ | — | 1428 | — | 602 | — | 216 | — | 33 | — | 79 | — | 18 |
| $SO_2$(Calc) | — | 134 | — | 255 | — | 207 | — | 80 | — | 140 | — | 61 |
| $CS_2$ | — | 0. | — | 1 | — | 1 | — | 1 | — | 1 | — | 0. |
| $H_2S$ | — | 140 | — | 379 | — | 714 | — | 1719 | — | 1345 | — | 1834 |
| $H_2S$ (Calc) | — | 268 | — | 510 | — | 416 | — | 161 | — | 279 | — | 122 |
| NO | — | 70 | — | 33 | — | 20 | — | 33 | — | 17 | — | 30 |
| $S_2$ Vapor (Calc) | — | 20 | — | 37 | — | 41 | — | 33 | — | 53 | — | 34 |

TABLE IV-continued

| | | | | | | | | | | | | |
|---|---|---|---|---|---|---|---|---|---|---|---|---|
| CH₄ | — | 0. | — | 0. | — | 7 | — | 0. | — | 9 | — | 0. |
| N₂ | 81.71 | — | 80.94 | — | X | — | 80.52 | — | 79.93 | — | 79.83 | — |
| CO | 1.73 | — | 1.21 | — | X | — | 1.22 | — | 2.00 | — | 2.02 | — |
| CO₂ | 16.54 | — | 17.41 | — | 16.56 | — | 17.58 | — | 17.07 | — | 17.01 | — |
| H₂ | 0.21 | — | 0.12 | — | 0.47 | — | 0.32 | — | 0.98 | — | 0.75 | — |
| O₂ | 0.01 | — | 0.00 | — | 0.02 | — | 0.00 | — | 0.01 | — | 0.00 | — |
| Ar | 0.16 | — | 0.16 | — | 0.17 | — | 0.16 | — | 0.16 | — | 0.16 | — |
| H₂S:SO₂ Ratio | 0.26 | | 1.04 | | 2.67 | | 16.64 | | 7.42 | | 24.76 | |
| % NO Conversion | 87.9 | | 94.3 | | 96.4 | | 94.3 | | 96.9 | | 95.0 | |
| % SO₂ Conversion | 29.5 | | 64.9 | | 80.6 | | 95.1 | | 90.3 | | 96.7 | |

X — No Analysis of individual N₂ and CO components; total N₂ + CO = 82.63 mol %
*Note: Includes SO₂ generated from the combustion of the coke itself; see Table III.

In addition to demonstrating the high $NO_x$ and $SO_x$ conversions previously described, this example also evidences a major advantage over prior art processes. Treating stack gases containing about 2000 ppmv $SO_2$ by most prior art processes tends to form COS in proportions exceeding about 300 ppmv. This is due to the reacton CO and S vapor to form COS in those processes utilizing coal as the reducing agent, and the reaction of CO and $SO_2$ to form COS in those processes utilizing catalytic reducing agents. The latter type processes will, when temperatures above 1250° F are utilized, usually produce a product gas containing more than 300 ppmv COS, even from a feed gas having a CO-$SO_2$ ratio as low as 2.0. (See *Ind. Eng. Chem. Process Des. Develop.*, Vol. 12, No. 1, 1973, pages 10–18, FIG. 4.) The instant process, however, will produce a product gas containing less than about 300 ppmv COS from a stack gas containing 2000 ppmv $SO_2$, even when said stack gas has, or generates within combustion zone 5, a CO:-$SO_2$ ratio in excess of 20.0. This is especially true when peak combustion zone operating temperatures exceed 1250° F. The reason for this is believed to reside in the fact that at such temperatures $H_2$ is formed from water vapor according to Reaction (III) in sufficient amounts to react preferentially with the $SO_2$ and/or S vapor, almost to the exclusion of the reactions between CO and $SO_2$ and/or S vapor. Thus, provided excess water is present in the stack gas in the proportions indicated hereinbefore, sufficient hydrogen will be generated in combustion zone 5 by Reaction (III) at temperatures between 1250° and 1500° F to suppress the formation of COS, whether by the reaction of $SO_2$ with CO or by the reaction of S vapor with CO. Generally speaking, when peak combustion zone operating temperatures between about 1250° and 1500° F are so utilized, less than about 15%, usually less than about 10%, of the $SO_x$ in the feed gas will be converted to COS while at least about 60%, usually at least about 70%, oftentimes in excess of about 80%, will be converted to $H_2S$, regardless of the $SO_x$ concentration in the feed gas stream. When operating in the broad temperature range of 900°–1600° F, conditions can be chosen so that at least about 30% of the $SO_x$ in the feed gas will be converted to $H_2S$.

Several embodiments of the invention are known and will now be set forth; however, it is noted that many other embodiments or modifications are also contemplated. The Example and the embodiments of the invention presented herein should not necessarily be construed as limiting the invention which is defined by the claims.

Several methods are known by which the stack gas may be contacted with the coke. The coke may be moved upwardly or downwardly through a reactor; likewise, the gas may in each instance be passed concurrently or countercurrently to the moving coke bed. Horizontally moving beds are also contemplated, as are stationary beds such as those utilized in the Example. However, if stationary beds are used, swing reactors will probably be necessary inasmuch as one reactor must be refilled with coke while the other is being used to process the stack gas.

While it is preferred that the stack gas be contacted with high or low sulfur bituminous coke, other cokes may also be utilized. It is also contemplated that other solid, high or low sulfur, carbonaceous materials such as char obtained from the pyrolysis of coal in coal gasification plants, and coal itself, especially anthracite may be used. However, the use of most coals to process stack gases containing oxygen may cause fusion of the coal into large aggregates which may be difficult to process as a moving bed or difficult to remove from a reactor in which the coal bed remains stationary. Additionally, the use of coal will produce volatile components such as phenols and benzene, which cannot be atmospherically discharged. Anthracite, however, is a notable exception inasmuch as it will neither agglomerate nor yield the volatile components typical of those produced from most coals.

Another embodiment of the invention embraces the concept of processing an portion of the coal normally utilized as a fuel in power plants, coal gasification plants, etc., through a conventional carbonization plant to convert said coal to coke, the preferred carbonaceous material for use in the process of the invention. Not only would this eliminate the cost of purchasing coke from a commercial supplier but it would also result in the production of valuable by-products from the coking process. Coal tar chemicals, such as phenols, cresols, benzene, toluene, xylene, naphthalene, etc., all of which are marketable or suitable as a fuel, would be produced from the carbonization plant. Also produced therefrom would be a low BTU off gas which could be used to preheat the stack gases prior to reducing the $NO_x$ and/or $SO_x$ in reactor 4. For example, the low BTU off gas could then be utilized as a fuel for start-up heater 17, which heater could than be modified so that all or a portion of the gases passing through line 15 could be heated on a continuous basis.

Stack gases containing particulate matter, such as are commonly produced from coal fired boilers in power plants, are especially contemplated as feed gases for the process of the invention. The bed of coke acts as an especially good filter for removing the particulates, particularly when the moving bed of coke is gravitating downwardly and the stack gas is passed upwardly therethrough. The use of the process of the invention in this manner will obviate the use of, or at least alleviate the burden of, electrostatic precipitators, which are usually employed in power plants to remove particulate matter and which may consume as much as 10% of the useful electrical energy generated by the power plant.

Although it may be rare to find a stack gas from which only $NO_x$ is to be removed without concern for the possible side reactions of $SO_x$, if present, it should be noted that the $NO_x$ can be successfully reduced in combustion zone 5 by reaction with any available CO in the stack gas, or with any CO generated as a result of Reaction (I). Thus, the presence or absence of water vapor in the stack gas would be immaterial in this instance. Such a process may be most desirable for treating a gas stream comprising $NO_x$ which has been separately removed from a stack gas. A simple blending of air therewith provides a suitable mixture for passing over the coke bed in the manner shown hereinbefore; alternatively, if the gas contains CO in addition to $NO_x$, the blending with air may not even be necessary.

Although the process herein is not believed to effect the conversion of the $SO_x$ and $NO_x$ components by catalytic means, it is specifically contemplated that the coke or other carbonaceous material used in the process may contain specific metals such as Co, Mo, Ni, Cr, Zr, Mn, Ti, Fe, V, Zn, Cu, Sn, etc., which may accelerate the reductions of the $SO_x$ and/or $NO_x$ comonents. In such a case it may even be found practicable to recycle at least a portion of the ash through the moving coke bed, thereby increasing the conversion of said components at any given operating temperature. Additionally, any retained heat in the recycled ash particles would tend to reduce the load on preheater 11 and thus save on the input energy requirements of the process.

We claim:

1. In a process for removing $SO_x$ components from an industrial stack gas stream also comprising $O_2$ and water vapor, said water vapor being present in a concentration in excess of three times the molar percentage of $SO_x$ components, wherein said $SO_x$ components are converted to $H_2S$, which $H_2S$ is subsequently removed, the improvement comprising:
   1. contacting said stack gas stream with a solid carbonaceous material in a combustion zone maintained at a peak temperature between about 900° and 1600° F so as to (a) convert at least some of said $SO_x$ components to $H_2S$ and COS, (b) consume essentially all of said $O_2$ in combustion of said carbonaceous material, and (c) consume a portion of said water vapor by reaction with said carbonaceous material to form CO and $H_2$, thereby producing a gaseous effluent of reduced $SO_x$ content but containing water vapor, $H_2S$, COS, residual $SO_x$ components, and at least sufficient $H_2$ and CO for the reduction of said residual $SO_x$ components to $H_2S$ in step (2) hereinafter;
   2. contacting said gaseous effluent from step (1) with a solid catalyst comprising cobalt and molybdenum at a temperature between about 300° and 800° F so as to (a) reduce at least some of said residual $SO_x$ components to $H_2S$ and (b) convert essentially all of said COS and $H_2S$ and essentially all of said CO to $CO_2$ and $H_2$ by reaction with water vapor;
   3. withdrawing a purified gas stream containing $H_2S$ as essentially the only gaseous sulfur component therein; and
   4. removing said $H_2S$ from said purified gas stream.

2. A process as defined in claim 1 wherein said $SO_x$ consists essentially of $SO_2$, said peak temperature is greater than 1250° F, and said carbonaceous material is selected from the class consisting of coal, coke, and char obtained from the pyrolysis of coal.

3. A process as defined in claim 2 wherein said stack gas stream contains solid particulate matter, of which particulate matter at least a portion is removed therefrom by said contacting of step (1).

4. A process as defined in claim 3 wherein said stack gas stream contains essentially no $H_2$ and said gaseous effluent from step (1) contains at least about 0.1 mol % $H_2$.

5. A process as defined in claim 1 wherein said industrial stack gas contains $NO_x$ components and wherein at least some of said $NO_x$ is converted to $N_2$ in step (1).

6. A process as defined in claim 5 wherein said industrial stack gas contains water vapor in a concentration in excess of three times the molar percentage of $SO_x$ plus $NO_x$ components.

7. A process as defined in claim 6 wherein said $SO_x$ consists essentially of $SO_2$, said peak temperature is greater than 1250° F, and said carbonaceous material is selected from the class consisting of coal, coke, and char obtained from the pyrolysis of coal.

8. A process as defined in claim 7 wherein said stack gas stream contains solid particulate matter, of which particulate matter at least a portion is removed from said stack gas by said contacting of step (1).

9. A process as defined in claim 8 wherein said stack gas stream contains essentially no $H_2$ and said gaseous effluent from step (1) contains at least about 0.1 mol % $H_2$.

* * * * *